(12) United States Patent
Zhou et al.

(10) Patent No.: US 7,601,668 B2
(45) Date of Patent: Oct. 13, 2009

(54) METHODS FOR MANUFACTURING BI-METALLIC CATALYSTS HAVING A CONTROLLED CRYSTAL FACE EXPOSURE

(75) Inventors: Zhenhua Zhou, Lawrenceville, NJ (US); Zhihua Wu, Lawrenceville, NJ (US); Cheng Zhang, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 461 days.

(21) Appl. No.: 11/537,462

(22) Filed: Sep. 29, 2006

(65) Prior Publication Data

US 2008/0081017 A1    Apr. 3, 2008

(51) Int. Cl.
B01J 23/00 (2006.01)
B01J 23/42 (2006.01)
B01J 23/44 (2006.01)
C01B 15/029 (2006.01)

(52) U.S. Cl. .................. 502/325; 502/339; 423/584
(58) Field of Classification Search ............... 502/325, 502/329, 339; 423/584
See application file for complete search history.

(56) References Cited

U.S. PATENT DOCUMENTS

| | | | |
|---|---|---|---|
| 3,625,879 A | 12/1971 | Horne et al. | 427/541 |
| 3,644,200 A | 2/1972 | Young | 208/120.15 |
| 3,686,340 A | 8/1972 | Patrick et al. | 585/485 |
| 3,700,745 A | 10/1972 | Kovach et al. | 585/485 |
| 4,028,274 A | 6/1977 | Kunz | 502/184 |
| 4,053,531 A | 10/1977 | Kerr et al. | 585/476 |
| 4,064,154 A | 12/1977 | Chandra et al. | 556/410 |
| 4,148,750 A | 4/1979 | Pine | 502/26 |
| 4,157,355 A | 6/1979 | Addison | 585/321 |
| 4,247,730 A | 1/1981 | Brunelle | 585/489 |
| 4,279,883 A | 7/1981 | Izumi et al. | 423/584 |
| 4,347,231 A | 8/1982 | Michaelson | 423/584 |
| 4,347,232 A | 8/1982 | Michaelson | 423/584 |
| 4,366,085 A | 12/1982 | Ikegami | 502/155 |
| 4,379,778 A | 4/1983 | Dalton, Jr. et al. | 423/584 |
| 4,476,242 A | 10/1984 | Puskas et al. | 502/185 |
| 4,513,098 A | 4/1985 | Tsao | 502/216 |
| 4,713,363 A | 12/1987 | Hucul | 502/262 |
| 4,826,795 A | 5/1989 | Kitson et al. | 502/184 |
| 4,832,938 A | 5/1989 | Gosser | 423/584 |
| 4,937,220 A | 6/1990 | Nickols, Jr. | 502/185 |
| 5,024,905 A | 6/1991 | Itoh et al. | 429/44 |
| 5,061,671 A | 10/1991 | Kitson et al. | 502/185 |
| 5,096,866 A | 3/1992 | Itoh et al. | 502/101 |
| 5,128,114 A | 7/1992 | Schwartz | 423/335 |
| 5,132,099 A | 7/1992 | Hiramatsu et al. | 423/584 |
| 5,132,480 A | 7/1992 | Tsutsui et al. | 585/489 |
| 5,180,573 A | 1/1993 | Hiramatsu et al. | 423/584 |
| 5,236,692 A | 8/1993 | Nagashima | 423/584 |
| 5,320,821 A | 6/1994 | Nagashima et al. | 423/584 |
| 5,338,531 A | 8/1994 | Chuang et al. | 423/584 |
| 5,352,645 A | 10/1994 | Schwartz | 502/262 |
| 5,372,981 A | 12/1994 | Witherspoon | 502/155 |
| 5,378,450 A | 1/1995 | Tomita et al. | 423/584 |
| 5,391,531 A | 2/1995 | Ward | 502/208 |
| 5,480,629 A | 1/1996 | Thompson et al. | 423/584 |
| 5,496,532 A | 3/1996 | Monzen et al. | 423/584 |
| 5,500,202 A | 3/1996 | Germain et al. | 423/584 |
| 5,698,488 A | 12/1997 | Birbara et al. | 502/325 |
| 5,767,036 A | 6/1998 | Freund et al. | 502/185 |
| 5,846,898 A | 12/1998 | Chuang et al. | 502/181 |
| 5,851,948 A | 12/1998 | Chuang et al. | 502/314 |
| 5,859,265 A | 1/1999 | Muller et al. | 549/531 |
| 5,900,386 A | 5/1999 | Freund et al. | 502/330 |
| 5,925,588 A | 7/1999 | Chuang et al. | 502/181 |
| 5,961,948 A | 10/1999 | Wanngard | 423/584 |
| 5,972,305 A | 10/1999 | Park et al. | 423/587 |
| 5,976,486 A | 11/1999 | Thompson et al. | 423/584 |
| 6,040,490 A | 3/2000 | Ichioka et al. | 585/475 |
| 6,054,507 A | 4/2000 | Funaki et al. | 523/210 |
| 6,069,286 A | 5/2000 | Wu et al. | 585/485 |
| 6,090,858 A | 7/2000 | El-Sayed | 516/97 |

(Continued)

FOREIGN PATENT DOCUMENTS

| | | |
|---|---|---|
| EP | 0 864 362 | 9/1998 |
| EP | 1 277 701 | 7/2002 |
| EP | 1 344 747 | 9/2003 |
| JP | 10324507 | 12/1998 |
| WO | WO 00/59635 | 10/2000 |
| WO | WO 02/14217 | 2/2002 |
| WO | WO 02/083550 | 10/2002 |
| WO | WO 02/092501 | 11/2002 |
| WO | WO 02/092502 | 11/2002 |
| WO | WO 03/014014 | 2/2003 |

OTHER PUBLICATIONS

"Shape-Controlled Synthesis of Colloidal Platinum Nanoparticles" by T. Ahmadi, et al., Science, vol. 272, Jun. 28, 1996, pp. 1924-1926.

*Primary Examiner*—Timothy C Vanoy
*Assistant Examiner*—Daniel Berns
(74) *Attorney, Agent, or Firm*—Workman Nydegger

(57) ABSTRACT

Improved bi-metallic nanocatalysts are manufactured using a control agent to produce nanoparticles having a controlled crystal face exposure. The bi-metallic nanocatalyst particles are manufactured in a two-step process. In a first step, nanocatalyst particles are manufactured using the control agent and the primary metal atoms. The primary metal atoms and the control agent are reacted to form complexed metal atoms. The complexed metal atoms are then allowed or caused to form nanoparticles. The nanoparticles formed in the first step using the control agent have a desired crystal face exposure. In a second step, the secondary metal atoms are deposited on the surface of the primary metal nanoparticles. The secondary catalyst atoms maintain the same crystal face exposure as the primary metal nanoparticles.

24 Claims, No Drawings

U.S. PATENT DOCUMENTS

| | | | |
|---|---|---|---|
| 6,106,797 A | 8/2000 | Muller et al. | 423/584 |
| 6,127,307 A | 10/2000 | Muller et al. | 502/162 |
| 6,159,267 A | 12/2000 | Hampden-Smith et al. | 75/252 |
| 6,168,775 B1 | 1/2001 | Zhou et al. | 423/584 |
| 6,194,338 B1 | 2/2001 | Andolfatto et al. | 502/101 |
| 6,284,213 B1 | 9/2001 | Paparatto et al. | 423/403 |
| 6,387,346 B1 | 5/2002 | Bertsch-Frank et al. | 423/584 |
| 6,500,968 B2 | 12/2002 | Zhou et al. | 549/531 |
| 6,500,969 B1 | 12/2002 | Zhou et al. | 549/531 |
| 6,518,217 B2 | 2/2003 | Xing et al. | 502/230 |
| 6,528,683 B1 | 3/2003 | Heidemann et al. | 562/542 |
| 6,534,440 B2 | 3/2003 | Choudhary et al. | 502/333 |
| 6,534,661 B1 | 3/2003 | Zhou et al. | 549/531 |
| 6,551,960 B1 | 4/2003 | Laine et al. | 502/327 |
| 6,576,214 B2 | 6/2003 | Zhou et al. | 423/584 |
| 6,630,118 B2 | 10/2003 | Paparatto et al. | 423/584 |
| 6,649,140 B2 | 11/2003 | Paparatto et al. | 423/584 |
| 6,676,919 B1 | 1/2004 | Fischer et al. | 423/584 |
| 6,713,036 B1 | 3/2004 | Vanden Bussche et al. | 423/584 |
| 6,740,615 B2 | 5/2004 | Zhou | 502/29 |
| 6,746,597 B2 | 6/2004 | Zhou et al. | 208/138 |
| 6,776,606 B2 | 8/2004 | Haskew | 431/2 |
| 6,782,892 B2 | 8/2004 | Li et al. | 131/364 |
| 6,888,013 B2 | 5/2005 | Paparrato et al. | 549/532 |
| 2001/0024634 A1 | 9/2001 | Bertsch-Frank et al. | 423/584 |
| 2002/0009414 A1* | 1/2002 | Moser et al. | 423/604 |
| 2003/0086853 A1 | 5/2003 | Devic | 423/272 |
| 2003/0215383 A1 | 11/2003 | Escrig et al. | 423/584 |
| 2004/0013601 A1 | 1/2004 | Butz et al. | 423/584 |
| 2004/0037769 A1 | 2/2004 | Paparatto et al. | 423/584 |
| 2004/0037770 A1 | 2/2004 | Fischer et al. | 423/584 |
| 2004/0081611 A1 | 4/2004 | Muller et al. | 423/584 |
| 2004/0151659 A1 | 8/2004 | Paparatto et al. | 423/584 |
| 2004/0151660 A1 | 8/2004 | Paparatto et al. | 423/584 |
| 2004/0184983 A1 | 9/2004 | Paparatto et al. | 423/584 |
| 2005/0014636 A1 | 1/2005 | Zhou et al. | 502/159 |

* cited by examiner

METHODS FOR MANUFACTURING BI-METALLIC CATALYSTS HAVING A CONTROLLED CRYSTAL FACE EXPOSURE

BACKGROUND OF THE INVENTION

1. The Field of the Invention

The present invention relates generally to supported catalysts and methods for making and using such catalysts (e.g., in the direct synthesis of hydrogen peroxide). More particularly, the present invention relates to the manufacture of bi-metallic catalysts that have a controlled crystal face exposure.

2. The Related Technology

Transition metal (e.g., noble metal) catalysts play a very important role in numerous industrial chemical processes, including pharmaceuticals manufacturing, petroleum refining, and chemical synthesis, among others. Cost pressures and the need for improved synthesis routes have led to continued improvement in catalyst performance.

Transition metal catalysts are typically small metal particles or crystallites. Since catalyst performance generally increases with decreased particle size, great efforts have been made to obtain particle catalysts with very small particle sizes. Recently, particle sizes of less than 10 nm have been achieved for some catalysts.

Although particle size is important to catalyst performance, there are many other factors that affect catalyst performance. One important performance characteristic of particle catalysts is selectivity. Many particle catalysts are inherently capable of catalyzing more than one reaction for a given reaction mixture. In most cases, only one product is desired and any other reaction products are by-products that reduce the yield of the manufacturing process. In addition to reducing yield, by-products may also increase the cost of isolating or concentrating the intended product.

In many cases, the different reactions are catalyzed by distinct active sites on the catalyst particle. Catalysis with a particle catalyst is achieved as reactants bond with catalyst atoms at the surface of the particle. The arrangement of the exposed atoms may determine catalytic properties of the catalyst. While one crystal face exposure may catalyze a desired reaction, another crystal face exposure may catalyze an undesired reaction.

Catalysts used for the direct synthesis of hydrogen peroxide exemplify catalysts in which selectivity is greatly affected by crystal face exposure. Direct synthesis of hydrogen peroxide is currently performed using palladium and platinum particles dispersed on a support material. Catalyst surfaces that have a (110) type crystal face exposure favor the formation of hydrogen peroxide, while catalyst surfaces with a (111) type crystal face exposure favor the formation of water, which is thermodynamically favored over the less stable hydrogen peroxide. Consequently, catalyst particles with predominantly (110) crystal face exposure are preferred for direct synthesis of hydrogen peroxide.

Recently, manufacturing techniques have been developed that allow catalysts particles to be formed with a controlled crystal face exposure. Examples of supported nanocatalysts are disclosed in U.S. Pat. Nos. 7,045,479 and 7,011,807. These catalyst particles can be manufactured using an organic control agent. The control agent molecules are reacted with catalyst atoms in solution to form organometallic complexes. The complexed atoms are then allowed or caused to form particles. As the particles form, the control agent molecules influence the crystal face exposure. Particles formed using this method have shown dramatic improvements in selectivity, reduced particle size, and improved particle stability.

While these recent improvements in catalyst performance have been substantial, there is still a need for improved selectivity. In particular, there is a need to improve the selectivity of bi-metallic catalysts. It is often essential to include more than one metal in a particle catalyst. The purpose or advantage of including more than one metal differs between catalysts, but in many cases the second metal is provided to enhance the rate of reaction, improve selectivity, and/or prevent catalyst poisoning. However, controlling crystal face exposure for bi-metallic catalysts can be more difficult than for a pure metal due to the interactions between the different catalyst atoms.

BRIEF SUMMARY OF THE INVENTION

The present invention is directed to an improved method for manufacturing a bi-metallic catalyst using a control agent to produce nanoparticles having a controlled crystal face exposure. The bi-metallic nanocatalyst particles are manufactured in a two-step process. In a first step, nanocatalyst particles are manufactured using the control agent a first type of metal atoms (i.e., the "primary metal atoms"). The primary metal atoms and the control agent are reacted to form complexed metal atoms. The complexed metal atoms are then allowed or caused to form nanoparticles. The nanoparticles formed in the first step using the control agent have a desired crystal face exposure.

In a second step, a second type of metal atoms (i.e., the "secondary metal atoms") is deposited on the surface of the primary metal nanoparticles. The deposition of the secondary metal atoms is performed after formation of the primary metal nanoparticles such that the crystal face exposure of the primary metal nanoparticles has already been determined. It has been unexpectedly found that deposition of the secondary metal atoms after forming nanoparticles from the primary metal atoms leads to improved catalyst selectivity.

In an exemplary embodiment, the deposition of the secondary catalyst atoms is performed under conditions that allow epitaxial growth of the secondary atoms on the primary catalyst atoms. The desired crystal face exposure of the nanocatalyst particles can be maintained in the second step of the process by using the primary metal nanoparticles as a template for the crystal growth of the secondary metal. In an exemplary embodiment, no additional control agent is added to the secondary catalyst atoms since the primary metal crystallites serve as a template for the growth of the secondary metal.

The present invention includes methods for manufacturing nanocatalysts for the direct synthesis of hydrogen peroxide and methods for manufacturing hydrogen peroxide using the nanocatalysts. In an exemplary embodiment, the direct synthesis hydrogen peroxide nanocatalysts comprise a palladium-based primary metal nanoparticle in which the palladium has a (110) type crystal face exposure.

The palladium nanoparticles are manufactured using straight chain organic polymers (e.g., polyacrylic acid) as the control agent. The complexed palladium atoms are reduced in solution to form colloidal palladium nanoparticles having a (110) type crystal face exposure. In an exemplary embodiment, reduction is performed using hydrogen.

Once the palladium nanoparticles are formed, the mixture is purged to remove free hydrogen. Thereafter, a solution of Pt, Au, Rh, or Ag, or any combinations of these is mixed with the Pd colloidal nanoparticles. The secondary metal or metals are deposited on the surface of the Pd nanoparticles. In an exemplary embodiment, hydrogen bound to the Pd reduces the secondary metal as the secondary metal bonds to the surface of the nanoparticle. The sequential reduction ensures the specific nanostructure of metal particles. Finally, the bimetallic particles are supported on a powder, granule, spherical or extruded shape support.

The catalysts manufactured according to the present invention can advantageously be used in the direct synthesis of hydrogen peroxide from hydrogen and oxygen. The direct synthesis catalysts give better $H_2O_2$ productivity and $H_2O_2$ selectivity for direct synthesis of hydrogen peroxide compared to existing direct synthesis hydrogen peroxide catalysts. The Pt-rich outer metal surface provides excellent resistance to metal leaching. Since the secondary metal is selectively deposited on the surface of the nanoparticles, the amount of secondary metal can be reduced while achieving the same or better catalyst performance, thereby reducing materials costs associated with the secondary metal.

These and other advantages and features of the present invention will become more fully apparent from the following description and appended claims as set forth hereinafter.

DETAILED DESCRIPTION OF EXEMPLARY EMBODIMENTS

I. Introduction and Definitions

The present invention is directed to the manufacture of novel supported bi-metallic catalysts. The novel catalysts are manufactured in a two-step process in which a primary metal colloid is formed using an organic control agent in a first step. In a second subsequent step, a secondary metal is deposited on the primary metal to make a bimetallic nanocatalyst particle. The deposition of the secondary metal is performed after the crystal face exposition of the primary metal particles has been determined by the control agent. The methods of the present invention can be used to manufacture catalysts for the direct synthesis of hydrogen peroxide. Direct synthesis hydrogen peroxide catalysts manufactured according to the present invention have shown improved selectivity and productivity for the formation of hydrogen peroxide.

The term "crystal face" refers to the top or outer layer of active catalyst atoms within a catalyst crystal. The terms "crystal face exposure" and "crystal face exposition" refer to the specific arrangement of catalyst atoms within a particular crystal face (e.g., low index crystal face exposures (100), (110), and (111)).

As discussed below with reference to the method of manufacturing the catalysts of the present invention, the control agent solution and optionally the support material control which face of the catalyst crystallite is predominantly exposed. Examples of low-index crystal faces that can be controllably exposed include the (110) crystal face of face centered cubic (FCC) crystal lattice, the (110) crystal face of the hexagonal closed packed (HCP) crystal lattices, the (101), (122), or (120) crystal face of an HCP crystal lattice, and the (112), (122) or (123) crystal face of a body-centered cubic (BCC) crystal lattice. The foregoing crystal face exposures all have a coordination structure where each active surface atom is coordinated with only two other active surface atoms. For purposes of the present invention, these coordination structures are collectively referred to as a "(110) type" crystal face exposure. A predominately (110) type crystal face exposure has been found to be advantageous for manufacturing hydrogen peroxide.

A control agent can also be selected to cause formation of other types of coordination structures. For example, the (111) crystal face of the FCC crystal lattice has active surface atoms with six neighboring (i.e. coordinated) surface atoms. Other types of crystal lattices have crystal face exposures with this type of coordination structure. For purposes of the present invention, these coordination structures are collectively referred to as "(111) type" crystal face exposure.

In all of the above crystal face designations, it will be understood by those skilled in the art that each named crystal face has many alternate Miller index designations, each of which are equivalent to those listed above (e.g., the (101) and (011) crystal faces of the FCC lattice are equivalent to the (110) crystal face). All of the unnamed but equivalent crystal face designations are understood to be included within the definitions of a "(111) type" or a "(110) type" crystal face exposure.

It is, at least theoretically, not essential for the catalytically active atoms to form a catalyst crystal per se, only that a preponderance of the top or outer layer of atoms in the catalyst particles attached to the support have the desired coordination structure. It may be possible to obtain increased reaction specificity regardless of whether the atoms are aligned as straight rows, in a zig-zag formation, or in less ordered rows having no uniform shape so long as the desired coordination structure is achieved.

According to one embodiment, at least about 50% of the catalytically active atoms in the nanocatalyst particles will advantageously have the selected crystal face exposure (i.e., coordination structure). More preferably at least about 70%, even more preferably about 90%, and most preferably at least about 95% of the active surface atoms will have the selected crystal face exposure. Reaction selectivity would theoretically be expected to be maximized in the case where 100% of the active surface atoms have the desired crystal face exposure.

The term "bi-metallic" refers to particles with two or more metal components.

The term "transition metal" includes base transition metals, noble metals, and the "rare earth metals" of the so called "inner transition metals" (i.e., f-block metals).

The term "particle size" refers to average particle size and "nanoparticle" refers to a particle having a particle size between about 1 nm and about 1000 nm.

II. Components Used to Make Metal-Containing Colloids and Supported Catalysts A. Metal Ions Any metals or group of metals that can react to form a complex with the organic control agent molecules can be used to form the primary metal colloids according to the present invention. In a preferred embodiment, the primary metal is a transition metal. Transition metals include base transition metals, noble metals, and rare earth metals.

Examples of suitable base transition metals include, but are not limited to, titanium, vanadium, chromium, manganese, iron, cobalt, nickel, copper, zinc, zirconium, molybdenum, tin, antimony, tungsten, and the like. These may be used alone, in various combinations with each other, or in combinations with other elements.

Examples of noble metals, also referred to as platinum-group metals, include platinum, palladium, iridium, gold, osmium, ruthenium, rhodium, rhenium, and the like. These may be used alone, in various combinations with each other, or in combinations with other elements.

Examples of rare earth metals include, but are not limited to, lanthanum and cerium. These may be used alone, in various combinations with each other, or in combinations with other elements.

The secondary metal can be any metal or group of metals that can be deposited on the primary metal colloidal particles. Examples of suitable metals for use as a secondary metal include the transition metals listed above for use as a primary metal. However, the secondary metal or metals should be different than the primary metal or metals by at least one element.

Optionally, non-transition metals can also be included as promoters or modifiers. Suitable non-transition metals include alkali metals and alkaline earth metals, such as sodium, potassium, magnesium, calcium, etc., and non-metals such as phosphorus, sulfur, oxygen, and halides.

B. Organic Control Agents and Organic Control Agent Molecules

The organic control agent, also referred to as a control agent or an organic agent, is selected to promote the formation of nanocatalyst particles that have a desired crystal face exposure. The control agent molecules react with the metal ions to form ligands complexed with the metal ions. During formation of the metal particles, the control agent can influence the arrangement and bonding of the metal atoms, thereby causing formation of particles with a particular crystal face exposure (e.g., (110) type or (111) type).

Control agents suitable for bonding metal ions include a variety of small organic molecules, polymers and oligomers. The control agent interacts and bonds with metal ions dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the control agent molecules and the metal ions, the control agent molecules include one or more appropriate functional groups. In one embodiment, the functional groups comprise a carbon atom bonded to at least one electron-rich atom that is more electronegative than the carbon atom and that is able to donate one or more electrons so as to form a bond or attraction with a metal ion. Preferred control agents include functional groups which have either a charge or one or more lone pairs of electrons that can be used to complex a metal ion. These functional groups allow the control agent to have a strong binding interaction with the metal ions.

In an exemplary embodiment, the functional groups of the control agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The control agent can be monofunctional, bifunctional, or polyfunctional.

Examples of suitable monofunctional control agents include carboxylic acids such as formic acid and acetic acid. Useful bifunctional control agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional control agents include sugars such as glucose, polyfunctional carboxylic acids such as citric acid, EDTA, pectins, cellulose, and the like. Other useful control agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The control agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

Depending on the desired stability of the nanocatalyst particles on the support material, the control agent can be selected to bond (e.g., covalently bond) with the support material so as to anchor or tether the nanocatalyst particles and/or atoms to the support material. While the control agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the metal ions. However, control agent molecules can have different functional groups for bonding to the support and also for bonding to the metal ions.

C. Solvents and Chemical Modifiers

The metal ions are prepared in a solution that can be applied to a catalyst support material. The solution can contain various solvents, including water and organic solvents. Solvents participate in catalyst formation by providing a solution for the interaction of metal ions and the control agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. It is also possible to add acids and bases as a solid material. For example, ion exchange resins that have basic or acid functional groups can be used. The solid material can be easily separated from the final colloid using simple techniques such as centrifugation and filtration. Surfactants may be added to adjust the surface tension of the mixture, or to stabilize the nanoparticles.

D. Reducing Agent

A reducing agent can be used to reduce complexed metal ions to a lower oxidation state. In some cases, reducing the metal atoms causes formation of the nanoparticles. Any compound capable of reducing the metal ions can be used. In a preferred embodiment, the reducing agent is hydrogen. Other suitable reducing agents include small organic molecules such as formaldehyde, formic acid, methanol, ethylene, and hydrides such as lithium aluminum hydride and sodium borohydride.

E. Support Materials

The nanocatalyst particles are deposited and/or formed on a support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

In an exemplary embodiment, the support material is treated with a strong mineral acid such as sulfuric or nitric acid. Sulfonation and/or nitration of the support material can facilitate bonding of the control agent to the support material and/or reduce leaching.

III. Methods of Making Supported Catalyst

Exemplary methods for manufacturing nanocatalyst particles according to the invention can be broadly summarized as follows. First, one or more types of primary metal atoms and one or more types of control agent are selected. Second, the primary metal atoms and the control agent are reacted or combined together to form a catalyst precursor having complexed metal atoms. Third, the complexed primary metal atoms are allowed or caused to form nanocatalyst particles. If a reducing agent is used to form the nanoparticles any remaining free reducing agent can be purged or otherwise removed once particle or colloid formation is complete. Fourth, the secondary metal atoms are deposited on the nanoparticles to form a bi-metallic catalyst. The bi-metallic nanocatalyst particles are then supported on a support material (unless the primary metal nanoparticles were formed in the presence of the support, in which case, the particles will have already been formed or deposited on the support material).

A. Formation of Precursor Composition

A catalyst precursor is generally formed by first dissolving the catalyst atoms and control agent in an appropriate solvent or carrier and allowing the catalyst atoms to recombine as metal complexes in solution or suspension. The metal complexes are then allowed or caused to form nanoparticles.

The catalyst atoms can be provided in any form so as to be soluble or dispersible in the solvent or carrier that is used to form the catalyst precursor. For example, catalyst atoms can be provided as metal salts that are readily dissolvable in the solvent or carrier. It may be advantageous to use metal chlorides and nitrates, since metal chlorides and nitrates are typically more soluble than other metal salts.

Primary catalyst atoms can be added to the solvent or carrier singly or in combination. The primary catalyst atoms are typically added as a single metal to avoid unnecessary interactions between different metals. However, in some cases, it may be desirable to form a primary particle with two or more metals where the desired coordination structure is achieved by two or more metals that are complexed with control agent molecules. In general, the composition of the primary metal nanoparticles will be determined by the types of catalyst atoms added to the precursor solution. Therefore, control of the amounts of metal salts added to the precursor solution provides a convenient method to control the relative concentrations of different types of catalyst atoms.

The control agent is selected to promote formation of nanoparticles with a desired crystal face exposure. It has been found that straight chain oligomers and polymers have a tendency to form particles with a (110) type crystal face exposure (e.g., unbranched polyacrylic acid). If a (111) type crystal face exposure is desired, small organic molecules or highly branched polymers can be used (e.g., glycolic acid).

In a preferred embodiment, the control agent is selected to form catalyst particles with a (110) type crystal face exposure for manufacturing hydrogen peroxide. An example of a suitable control agent for forming nanoparticles with selective (110) crystal face exposure is polyacrylic acid having a molecular weight of about 1200 MW and minimal or no branching.

Although the selection of the control agent is typically the most significant factor for determining crystal face exposure, other factors can also have an impact. For example, crystal face exposure can be affected by the concentration of the control agent, type of solvent, particular metal ions, type and/or presence of a support material, and/or reaction conditions.

The control agent is added to the solvent or carrier in a manner so as to facilitate association of the control agent with the catalyst atoms in order to form the catalyst precursor. Some control agents may themselves be soluble in the solvent or carrier. In the case of control agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

In addition to the characteristics of the control agent, it can also be advantageous to control the molar ratio of control agent to the catalyst atoms in a catalyst suspension. A more useful measurement is the molar ratio between control agent functional groups and catalyst atoms. For example, in the case of a divalent metal ion two molar equivalents of a monovalent functional group would be necessary to provide the theoretical stoichiometric ratio. Typically the molar ratio of control agent functional groups to catalyst atoms is preferably in a range of about 0.001:1 to about 50:1. For hydrogen peroxide catalysts the ratio is advantageously in a range of about 0.5:1 to about 40:1, more preferably in a range from about 1:1 to about 35:1, and most preferably in a range of about 3:1 to about 30:1.

B. Colloid and/or Nanoparticle Formation of the Primary Metal

Once the metal atoms are complexed, the primary metal atoms are allowed or caused to form nanoparticles. In some cases, the nanoparticles may be crystalline and/or in a final coordination structure. In other embodiments, the particle formation may be intermediate. In either case, the presence of the control agent has at least partially controlled the arrangement of the atoms in the particle such that the crystal face exposure is predominantly of a desired type.

In one embodiment, nanoparticles are allowed to form by simply letting the precursor composition sit. In this embodiment, components in the precursor composition (e.g., solvent) may serve as a reducing agent or otherwise facilitate formation of the nanoparticles.

In an alternative embodiment, a reducing agent (e.g., hydrogen) can be added to the precursor composition to induce particle formation or to cause particle formation to happen more rapidly. In a preferred embodiment, following reduction, a portion of the reducing agent atoms or molecules remain bound to the surface atoms of the nanoparticles. These reducing agent atoms or molecules can then serve as a reducing agent for secondary metal atoms, which are added thereafter, as described below. In this embodiment, free reducing agent is preferably removed from the solution such that reduction of the secondary atoms occurs at the surface of the nanoparticles.

In one embodiment, a support material can be used to facilitate nanoparticle formation. In this embodiment, the precursor solution is added to a support material and particle formation occurs in the presence of the support material. In an exemplary embodiment, the control agent can be bonded to the support material prior to forming a complex with the metal ions. This method is useful when the bonding of the control agent to the support is beneficial to particle formation and where the presence of the support material does not adversely affect the deposition of the secondary metal on the primary metal nanoparticles.

C. Deposition of Secondary Metal

Once the primary metal nanoparticles are formed sufficiently that the controlled crystal face exposition is determined, the secondary metal atoms are deposited on the primary metal nanoparticles to form bi-metallic nanocatalyst particles. The secondary metal atoms are typically provided as a metal salt in solution. In a preferred embodiment, the bi-metallic nanocatalyst particles are formed in a colloid such that the secondary metal can be deposited out of solution and onto the surface of suspended primary metal nanoparticles. Residual reducing agent (e.g., hydrogen) on the surface of the primary catalyst particles may advantageously assist in depositing secondary metal atoms in a reduced state onto the surface of the primary catalyst particles.

In an exemplary embodiment, the secondary metal nanoparticles are added to the primary metal nanoparticles without a control agent. The secondary atoms are preferably deposited on the primary metal nanoparticles epitaxially so as to maintain the same crystal face exposure as the primary metal nanoparticles. The bi-metallic nanoparticles formed from the deposition of the secondary metal or metals advantageously exhibits the catalytic properties of the primary and secondary metals but has the crystal face exposure of the primary metals.

D. Supporting and Activating Nanocatalyst Particles

The nanocatalyst particles are impregnated into or otherwise applied to a support material. Depending on the physical form of the solid support, the process of contacting or applying the catalyst precursor to the support may be accomplished by a variety of methods. For example, the support may be submerged or dipped into a solution or suspension comprising a solvent or carrier and the catalyst precursor. Alternatively, the solution or suspension may be sprayed, poured, painted, or otherwise applied to the support, such as by incipient wetness impregnation. Thereafter, the solvent or carrier is removed, optionally in connection with a reaction step that causes the control agent to become chemically bonded or adhered to the support. Either way, the process yields a supported catalyst or an intermediate supported catalyst composition.

Metal loadings of the catalyst component on the support material can vary depending on the intended use of the supported catalyst. In a preferred embodiment, the metal loading is between about 0.01% and about 10% by weight, and more preferably between about 0.05% and about 5% by weight. These loading amounts are useful for catalysts for direct synthesis of hydrogen peroxide, for example. In many cases it can be advantageous to have metal loadings of at least about 0.1 wt %.

Acid functionalization of the support material according to the present invention has been found to yield improved catalyst performance at these metal loadings.

The use of the control agent allows for the formation of very small and uniform nanoparticles. In general, the nanocatalyst particles formed in the presence of the control agent are preferably less than about 20 nm in size. In some cases, the nanocatalyst particles may be atomically dispersed. The nanocatalyst particles more preferably have an average particle size less than about 15 nm, and most preferably less than about 10 nm.

If desired, the catalyst nanoparticles can be reduced to activate the catalyst prior to use. Examples of suitable reducing agents include but are not limited to, hydrogen, lithium aluminum hydride, sodium hydride, sodium borohydride, sodium bisulfite, sodium thiosulfate, hydroquinone, methanol, aldehydes, carbon monoxide, ammonia, and the like. Hydrogen is preferred. The reduction process may be conducted at a temperature between 20° C. and 600° C.

Finally, the catalyst can be further processed into a finished product of size and shape suitable for a specific reactor or process configuration. For example, a powder may be processed by, among other methods, extrusion, pelletizing, or spray drying.

IV. Methods of Manufacturing Hydrogen Peroxide

The supported catalysts of the present invention are particularly advantageous for the direct synthesis of hydrogen peroxide from hydrogen and oxygen. In a preferred embodiment, hydrogen peroxide promoting catalysts manufactured according to the present invention include a combination of palladium and platinum. In addition, the catalyst nanoparticles are preferably controllably formed to have a (110) type crystal face exposure.

The catalysts of the present invention can be used in any type of reactor suitable for the direct synthesis of hydrogen peroxide. Suitable reactors include fixed bed, ebullated bed, and slurry reactors. In a preferred embodiment, the catalysts of the present invention are loaded into a fixed bed or ebullated bed reactor for hydrogen peroxide production. The use of the catalysts of the present invention in a fixed bed or ebullated bed reactor facilitates the recovery and regeneration of the catalyst.

To load the catalysts in a fixed bed or ebullated bed reactor, the supported catalysts are manufactured to have a size and/or shape suitable for a fixed bed or ebullated bed. For example, the supported catalysts can be manufactured into particulates such as beads or spheres that have a size suitable for use in a fixed bed or fluidized bed reactor. In an exemplary embodiment, the particulate has a nominal dimension of at least about 0.5 mm, and more preferably at least about 1 mm. Alternatively, the support material can be extruded to make a part with dimensions that are suitable for use in any size or shaped fixed bed reactor.

Extruding, crushing or otherwise shaping the support material for use in a particular type of reactor is typically done before anchoring the catalyst onto the support material such that the catalyst is distributed over substantially the entire support surface that is exposed in the reactor.

Once the supported catalyst is placed into a suitable reactor, hydrogen peroxide can be directly synthesized by introducing a feedstream of hydrogen gas and molecular oxygen. In an exemplary embodiment, hydrogen is introduced into the reactor in a concentration less than the flammability limit of hydrogen. The oxygen concentration preferably ranges from about 5% to about 97% by volume, more preferably from about 10% to about 80%, and most preferably from about 20% to about 60%. For concentrations of oxygen greater than about 25%, it is advantageous to use an inorganic support to avoid oxidation of the support.

The supported catalysts of the present invention have metal loadings and suitable activity for the efficient production of hydrogen peroxide at low hydrogen concentrations. Because the metal component of the catalyst material is anchored to the support material, the supported catalysts have extended life and are easily recovered and regenerated. For reactors such as fixed bed and fluidized bed reactors, the supported catalysts are particularly easy to recover, thereby reducing ongoing cost of hydrogen peroxide production.

V. EXAMPLES

The following examples are exemplary procedures for manufacturing supported catalyst according to the present invention and for manufacturing hydrogen peroxide using these catalysts.

Example 1

Catalyst Preparation

Example 1 describes a method for preparing a bi-metallic catalyst according to the present invention. 3.6085 g of a $PdCl_2$ solution (25.01% w/w Pd solution) was diluted to 100 ml and added to a 500 mL flask. An additional 50 ml of deionized water was added to obtain 150 ml of a palladium solution.

22.67 gram of a 45% w/w polyacrylic acid sodium salt solution was diluted to 100 ml and added to the palladium solution, with the addition of another 5 ml deionized water to obtain a precursor solution. The precursor solution was purged with $N_2(g)$ at 100 ml/min for one hour, then switched to $H_2(g)$ at over 100 ml/min for 10 hours to obtain a palladium colloid.

The palladium colloid was purged with $N_2(g)$ at 100 ml/min for two hours to remove free hydrogen gas. At the same time, 45 ml of a 0.04 Pt wt % $H_2PtCl_6$ solution was placed into a pressure equalizing funnel that was connected to the flask containing the palladium colloid. The $H_2PtCl_6$ solution was purged with $N_2(g)$ at 100 ml/min for two hours. Thereafter, the purged $H_2PtCl_6$ solution was added dropwise to the palladium colloid while stirring to form a bi-metallic colloid. The bi-metallic colloid was held for three hours to allow Pt to be reduced.

A supported bi-metallic catalyst containing 0.36 wt % Pd was prepared using the bi-metallic colloid. 60 g of the bi-metallic colloid was placed in a flask with 50 grams of sulfated silica beads. This mixture was rotated and heated under an IR lamp for 2 hours and then dried in an oven at 105° C. for 10 hours. The catalyst was then activated by reducing with hydrogen gas.

Example 2

Use of Supported Catalyst in $H_2O_2$ Process

Example 2 describes a method for manufacturing hydrogen peroxide using the supported catalyst of Example 1. 0.5 g of the catalyst manufactured in Example 1 (containing 0.36% wt % Pd) was charged to a tubular fixed bed reactor with a nominal diameter of 0.375 inches. The tubular reactor was operated at a pressure of 750 psig, and maintained at an internal temperature of 35° C. The tubular reactor was fed continuously with 5 liter/hour of a gas feed containing 3 vol % hydrogen, 40 vol % oxygen, and the balance inert gas. The reactor was also fed continuously with 10 cc/hr of a liquid feed containing 4 wt % water, 650 ppmw $H_2SO_4$, and 15 ppmw NaBr, with the balance being methanol. Gaseous and liquid effluents from the tubular reactor were collected continuously and analyzed to obtain data on the amount of hydrogen converted and the amount of hydrogen peroxide generated and also to calculate the selectivity for hydrogen peroxide and productivity (g $H_2O_2$ produced per g Pd per hour). The selectivity and productivity of the process of Example 2 are shown in Table 1.

Example 3

Comparative Catalyst Preparation and Use

Example 3 describes a method of manufacturing a bi-metallic catalyst using a colloidal suspension. Example 3 is provided for comparative purposes. The catalyst manufactured in Example 3 was prepared using the method of Example 1 except that the palladium and platinum solutions were mixed before formation of the colloid (i.e., before reduction with hydrogen) and the polyacrylic acid was allowed to complex with the platinum.

The catalyst manufactured in Example 3 was used in the direct synthesis of hydrogen peroxide. The process for manufacturing hydrogen peroxide was carried out identical to the process of Example 2, except that the comparative catalyst of Example 3 was used. The results of the hydrogen peroxide synthesis using the comparative catalyst are shown in Table 1.

TABLE 1

|  | $H_2O_2$ Selectivity (%) | | | Productivity (g $H_2O_2$/g Pd/hr) | | |
| --- | --- | --- | --- | --- | --- | --- |
| Running Time/hour | 16 | 32 | 48 | 16 | 32 | 48 |
| Example 2 | 67 | 71 | 74 | 248 | 261 | 253 |
| Comparative Example 3 | 53 | 54 | 55 | 221 | 229 | 223 |

The catalyst manufactured according to the present invention has substantially improved selectivity and productivity at all time intervals, which is an unexpected result. The increased selectivity is believed to be the result of improvements in controlled crystal face exposure by removing platinum during particle formation and epitaxially depositing the platinum on the surface of the palladium with a controlled crystal face exposure. In addition, the improvement in selectivity resulted in improved productivity thus indicating the economic advantage of using the bimetallic catalysts manufactured according to the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a supported bi-metallic nanocatalyst having a controlled crystal face exposure, comprising,
   (i) preparing a solution comprised of a plurality of primary metal atoms composed of a first element and a plurality of control agent molecules and allowing the primary metal atoms and control agent molecules to react to form a complex;
   (ii) allowing or causing the complexed metal atoms to form a plurality of first nanoparticles composed of the primary metal atoms having a controlled crystal face exposure;
   (iii) thereafter depositing a plurality of secondary catalyst atoms composed of a second element that differs from the first element of the primary metal atoms on an outer surface of the first nanoparticles so as to form bimetallic nanoparticles composed of the first nanoparticles and the secondary catalyst atoms disposed on the outer surface of the first nanoparticles, the bimetallic nanoparticles having the same controlled crystal face exposure as the first nanoparticles; and (iv) supporting the nanoparticles on a support material.

2. A method as in claim 1, in which the first nanoparticles have a (110) type crystal face exposure.

3. A method as in claim 1, in which the first nanoparticles have a (111) type crystal face exposure.

4. A method as in claim 1, in which (ii) comprises reducing the nanoparticles using a reducing agent.

5. A method as in claim 4, in which the reducing agent comprises hydrogen.

6. A method as in claim 4, wherein (ii) further comprises removing or oxidizing at least a portion of any free reducing agent remaining in the solution following reduction of the metal atoms.

7. A method as in claim 1, in which the primary metal atoms comprise a transition metal and the secondary metal atoms comprise a transition metal that is different from the primary metal atoms by at least one element.

8. A method as in claim 1, in which the control agent molecules comprise small organic molecules or highly branched oligomers or polymers.

9. A method as in claim 1, in which the control agent molecules comprise straight chain oligomers or polymers.

10. A method as in claim 1, in which the organic control agent molecules bond to the primary catalyst atoms though at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

11. A method as in claim 1, in which the secondary catalyst atoms is deposited on the nanoparticles in solution so as to form bi-metallic colloidal nanoparticles.

12. A method as in claim 1, in which the secondary catalyst atoms are epitaxially grown on the surface of the nanoparticles so as to maintain the controlled crystal face exposure.

13. A method as in claim 1, in which at least a portion of the control agent molecules bond to the nanoparticles and to the support surface so as to tether the nanoparticles to the support material.

14. A method as in claim 1, wherein the metal loading of the catalyst nanoparticles on the support material is greater than about 0.1 wt %.

15. A method as in claim 1, where (iv) is performed before (iii).

16. A supported bi-metallic catalyst manufactured according to the method of claim 1.

17. A method of manufacturing hydrogen peroxide, comprising:

placing the supported bi-metallic catalyst of claim 16 in a reactor; and introducing a hydrogen feedstream and an oxygen feedstream into the reactor under conditions suitable for catalyzing the production of hydrogen peroxide using the supported catalyst.

18. A method for manufacturing a supported bi-metallic nanocatalyst having a controlled crystal face exposure, comprising:

(i) preparing a solution comprised of a plurality of primary catalyst atoms composed of a first element and a plurality of organic control agent molecules and allowing the primary catalyst atoms and control agent molecules to react to form a complex;

(ii) causing formation of colloidal nanoparticles having a controlled crystal face exposition by reducing the complex in the solution with a reducing agent;

(iii) removing or neutralizing at least a portion of any free reducing agent remaining in the solution following step (ii);

(iv) depositing, without the use of a control agent, a plurality of secondary catalyst atoms composed of a second element that differs from the first element of the primary catalyst atoms on an outer surface of the colloidal nanoparticles to form a plurality of bi-metallic colloidal nanoparticles; and (v) supporting the bi-metallic nanoparticles on a support material.

19. A method as in claim 18, in which the primary catalyst atoms are a platinum group metal and the secondary metal atoms comprise a platinum group metal that is different from the primary metal atoms.

20. A method as in claim 19, in which the ratio of primary metal atoms to secondary metal atoms is in a range from about 1:1 to about 1000:1.

21. A method as in claim 18, in which the organic control agent molecules bond to the primary catalyst atoms though at least one functional group selected the group consisting of a hydroxyl, a carboxyl, a carbonyl, an amine, an amide, a nitrile, a nitrogen with a free lone pair of electrons, amino acid, a thiol, a sulfonic acid, a sulfonyl halide, and an acyl halide.

22. A method as in claim 18, in which the reducing agent is hydrogen.

23. A supported catalyst manufactured according to the method of claim 18.

24. A method of manufacturing hydrogen peroxide, comprising:

placing the supported catalyst of claim 23 in a reactor; and introducing a hydrogen feedstream and an oxygen feedstream into the reactor under conditions suitable for catalyzing the production of hydrogen peroxide using the supported catalyst.

* * * * *

UNITED STATES PATENT AND TRADEMARK OFFICE
CERTIFICATE OF CORRECTION

PATENT NO. : 7,601,668 B2 Page 1 of 1
APPLICATION NO. : 11/537462
DATED : October 13, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Fifth Day of October, 2010

David J. Kappos
*Director of the United States Patent and Trademark Office*